(12) United States Patent
de Mello Brandao et al.

(10) Patent No.: US 10,936,805 B2
(45) Date of Patent: *Mar. 2, 2021

(54) AUTOMATED DOCUMENT AUTHORING ASSISTANT THROUGH COGNITIVE COMPUTING

(71) Applicant: International Business Machines Corporation, Armonk, NY (US)

(72) Inventors: Rafael R. de Mello Brandao, Botafogo (BR); Renato Fontoura de Gusmao Cerqueira, Barra da Tijuca (BR); Marcio F. Moreno, Copacabana (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,266

(22) Filed: Jan. 28, 2020

(65) Prior Publication Data

US 2020/0167523 A1     May 28, 2020

Related U.S. Application Data

(63) Continuation of application No. 15/459,497, filed on Mar. 15, 2017, now Pat. No. 10,579,725.

(51) Int. Cl.
| | |
|---|---|
| *G06F 40/186* | (2020.01) |
| *G06F 3/0481* | (2013.01) |
| *G06F 40/30* | (2020.01) |
| *G06F 40/253* | (2020.01) |

(52) U.S. Cl.
CPC ......... *G06F 40/186* (2020.01); *G06F 3/0481* (2013.01); *G06F 40/253* (2020.01); *G06F 40/30* (2020.01)

(58) Field of Classification Search
CPC ........ G06F 40/10; G06F 40/186; G06F 40/30; G06F 40/253; G06F 3/0481
See application file for complete search history.

(56) References Cited

U.S. PATENT DOCUMENTS

| | | |
|---|---|---|
| 5,873,107 A | 2/1999 | Borovoy et al. |
| 2011/0295878 A1 | 12/2011 | Bennett et al. |
| 2013/0243208 A1 | 9/2013 | Fawer |

(Continued)

OTHER PUBLICATIONS

Sharpies, M., et al., "Developing a Writer's Assistant", Computers and Writing: Models and tools, Jan. 1989, pp. 22-36.

(Continued)

*Primary Examiner* — Sanchita Roy
(74) *Attorney, Agent, or Firm* — Scully, Scott, Murphy & Presser, P.C.; Joseph Petrokaitis

(57) ABSTRACT

A document editor user interface interacts with a user in receiving content from the user and provides suggestions determined via cognitive computing to the user while the user is authoring a document. A search engine searches for information associated with the content and returns the information. A matching candidate template that matches a style of the document being authored is searched for and may be inferred based on the document being authored. The suggestions may be provided based on definitions of the candidate template. A cognitive component may continuously detect behavior of the user while authoring the document and store information associated with the detected behavior. Additional suggestions may be provided based on the detected behavior.

20 Claims, 14 Drawing Sheets

(56) References Cited

U.S. PATENT DOCUMENTS

| | | |
|---|---|---|
| 2014/0013212 A1 | 1/2014 | Von Haden et al. |
| 2014/0040238 A1 | 2/2014 | Scott et al. |
| 2014/0163954 A1 | 6/2014 | Joshi et al. |
| 2015/0082189 A1 | 3/2015 | Baer et al. |
| 2015/0363380 A1 | 12/2015 | McNaught |
| 2016/0041957 A1 | 2/2016 | Finsterwald et al. |
| 2017/0220535 A1 | 8/2017 | Olsen et al. |
| 2018/0060439 A1 | 3/2018 | Kula et al. |

OTHER PUBLICATIONS

Montero, J.M., et al., "Anestte: a Writter's Assitant for a Specific Purpose Language", http://www.fi.muni.cz/tsd2002/papers/79_Juan_M._Montero.pdf, Accessed on Jan. 20, 2017, 7 pages.

Byrne, J.R., "CAWriter: A CSCW/CSCL Tool to Support Research Students' Academic Writing", 2010, the Authors, http://ewic.bcs.org/upload/pdf/ewic_hci10_paper54.pdf, Accessed on Jan. 19, 2017, pp. 458-462.

"Google Docs", Google, https://www.google.com/intl/en/docs/about/, Accessed on Jan. 19, 2017, 6 pages.

"Microsoft Word Document and Word Processing Software", Microsoft, https://products.office.com/en-us/word, Accessed on Jan. 19, 2017, 10 pages.

"Congree", Congree, http://www.congree.com/en/, Accessed on Jan. 19, 2017, 5 pages.

"Congree for Microsoft Word", Congree, http://www.congree.com/fileadmin/sector/products/plugins/congree-microsoft-word-en.pdf, Accessed on Jan. 19, 2017, 2 pages.

List of IBM Patents or Patent Applications Treated as Related, dated Jan. 28, 2020, 2 pages.

AUTOMATED DOCUMENT AUTHORING ASSISTANT THROUGH COGNITIVE COMPUTING

FIELD

The present application relates generally to computers and computer applications, and more particularly to computer-assisted document authoring supported by cognitive computing.

BACKGROUND

Computer-implemented document authoring includes creating, editing, and reviewing documents automatically or semi-automatically via computer software or the like executing on a computer or the like device. Computer-assisted or automated document authoring is a complex task since it involves supporting author's creativity and the necessity to ensure consistency during authoring. Elaborating ideas presents inherently a cognitive-intensive task and authors often find it difficult to reify their thoughts. Authors may end up with a document or artifact semantically different from what was initially planned. In other words, it is not rare that authors take different paths without even noticing that they have done so. Guaranteeing quality and consistency on created content generally is difficult to achieve. For instance, aspects such as adequate content resolution and format, matching visual design, semantic suitability and expressiveness are not trivial. In the same direction, lack of smooth subject transitions or even poor narrative evolution, awkward phrasing in texts and inconsistent concepts in visual materials are not uncommon, not to mention other issues such as usage of unconventional grammar, sentence structure and correctly addressing intended concepts.

Content reuse is not trivial as well. Pinpointing and fetching previously created content that is pertinent to the current document is time-consuming to authors. In addition, collaborative authoring may produce documents with undesired mixed styles. Before creating content, users may be also required to identify relevant aspects in such content and find relevant related materials to expand their knowledge about a given aspect. For example, a user creating new knowledge in the form of legal documents, scientific papers, or a technical report replies on the user's own knowledge in identifying and structuring new material in a way that makes sense to the user's understanding. If the author needs a suggestion on a given aspect, the author's only resort may be to ask for feedback from peers. Analysis and structuring of concepts presented in unstructured data (conveyed in any kind of media) constitute an interpretive challenge in the practice of document authoring. Added to the fact that structuring and correlation of concepts in authoring is inherently a cognitive-intensive task, creating new content can be a time-consuming activity. In this aspect, a computer-assisted or automated process that assists users (authors) to create content may contribute to a more agile production.

BRIEF SUMMARY

A cognitive computing system and method that assist automatic document authoring may be provided. The system in one aspect may include at least one hardware processor executing a document editor user interface that interacts with a user in receiving content from the user and providing suggestions to the user while the user is authoring a document via the document editor user interface. A search engine searches for information associated with the content and returns the information. Suggestions provided to the user are based on the information. At least one storage device stores a repository of authored documents, a repository of user behavioral profiles, and a repository of document templates. The at least one hardware processor searches the repository of document templates for a candidate template that matches a style of the document being authored. The at least one hardware processor infers the candidate template responsive to not finding the candidate template in the repository of document templates, wherein the suggestions are further determined based on a definition specified in the candidate template. The at least one hardware processor continuously detects a behavior of the user while authoring the document and stores information associated with the detected behavior of the user in the repository of user behavioral profiles. The suggestions may be further tailored based on the detected behavior of the user.

A method providing document authoring assistance, in one aspect, may include executing a document editor user interface that interacts with a user in receiving content from the user and providing suggestions to the user while the user is authoring a document via the document editor user interface. The method may also include searching for information associated with the content and returning the information, wherein the suggestions provided to the user are based on the information. The method may further include storing a repository of authored documents, a repository of user behavioral profiles, and a repository of document templates in at least one storage device. The method may also include searching the repository of document templates for a candidate template that matches a style of the document being authored. The method may also include inferring the candidate template responsive to not finding the candidate template in the repository of document templates, wherein the suggestions are further determined based on a definition specified in the candidate template. The method may further include continuously detecting behavior of the user while authoring the document and storing information associated with the detected behavior of the user in the repository of user behavioral profiles, wherein the suggestions are further tailored based on the detected behavior of the user.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
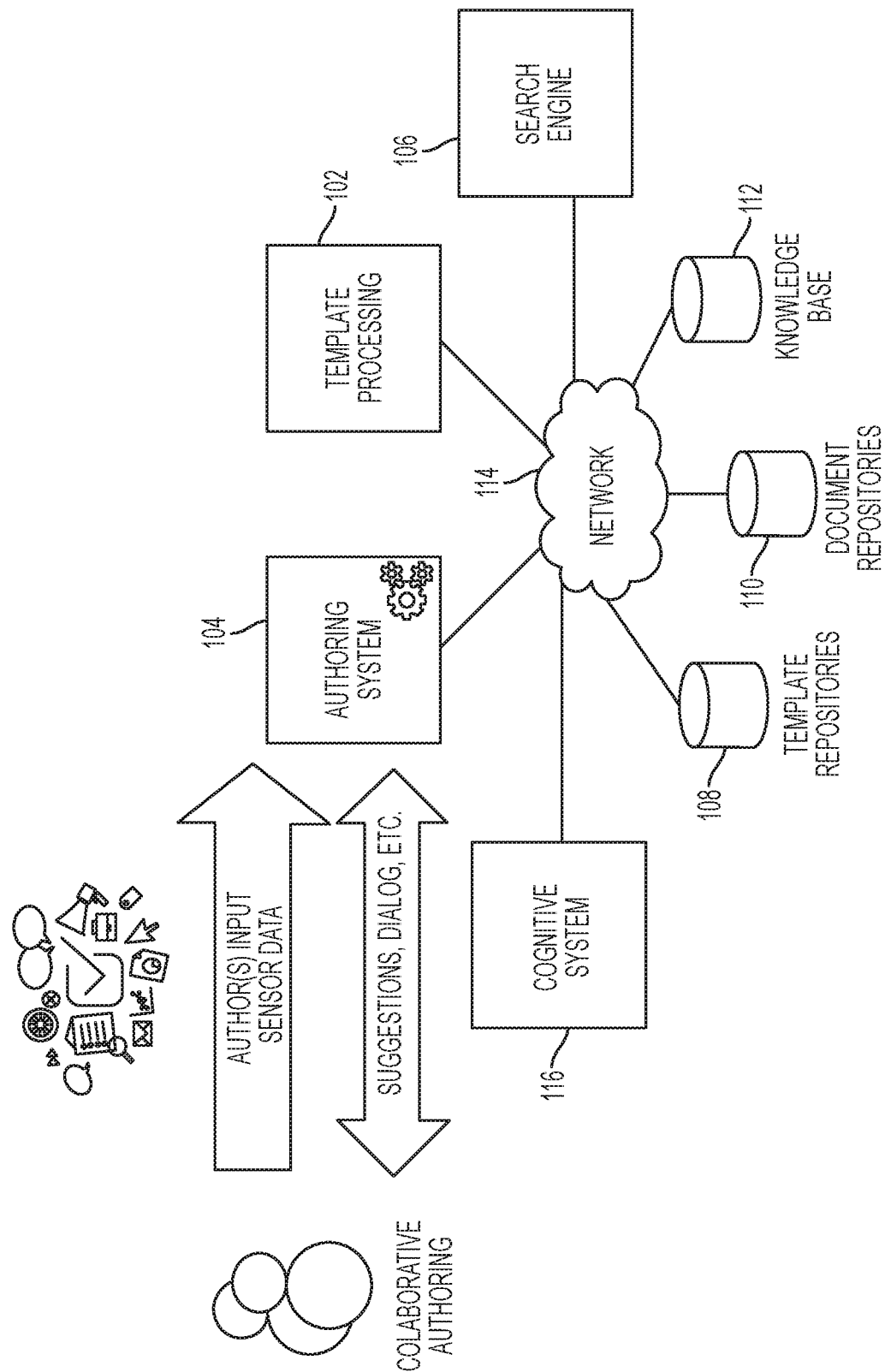
FIG. 1 is a diagram showing components of a system in one embodiment of the present disclosure.

Methodology and techniques are disclosed that provide intelligent computer-assisted document authoring via cognitive computing. The methodology and techniques may improve existing computer word processing and/or document authoring technology.

In one aspect, a computer-implemented document authoring of the present disclosure may learn from an author's profile and behavior, previously authored documents, semantic templates, knowledge bases, as well as data available through search engines. The computer-implemented document authoring may also implement an interactive user interface that includes a conversational mode to extract an author's intention and suggest content. Content suggestions may be provided in a dynamic fashion while the document authoring takes place. The computer-implemented document authoring may also assess the content's semantics dynamically during document authoring. The computer-implemented document authoring may monitor the narrative evolution by controlling authoring styles, narrative milestones and subjects that should be covered. This monitoring may be done in real-time through artificial intelligence (AI) techniques, for example, including Machine Learning classifiers, Natural Language Processing (NLP), and Computer Vision (CV), to infer content semantics from authors' input text and visual data.

In one embodiment, the computer-implemented document authoring of the present disclosure assists in document creation, editing and reviewing based on cognitive systems that are fed with data from knowledge bases, document repositories and capturing devices such as cameras, eye-tracking devices, microphones, and Internet of Things (IoT) sensors, to understand authors, learn their behavior and preferences. The computer-implemented document authoring of the present disclosure in one embodiment continuously learns from produced content and from author expressions, habits and intentions, and based on the learning may suggest contextual content and also may balance whether to suggest an optimal working time schedule that users statistically perform better. The computer-implemented document authoring of the present disclosure may also take into account authors' writing styles, including in a collaborative authoring mode where multiple literary style from authors may be mixed in a given document. In such mode, the system may consider goals specified by multiple authors and monitor the amount and quality of produced content by each author. This way, the computer-implemented document authoring of the present disclosure is able to assess undesired mixed literary styles, check if content quality and predefined goals are being met, and able to correlate content and environment data (e.g., background noise, presence of other people in the room) to enhance authoring productivity. In another aspect, the computer-implemented document authoring of the present disclosure provides a conversational mode where authors can interact with the cognitive system using natural language to ask for content suggestions.

Traditional tools for document authoring provide limited support for creation, editing, and reviewing tasks. They typically support users by providing 'What you see is what you get' (WYSIWYG) interfaces. While the existing document authoring tools may be able to handle a variety of visual content such as images, graphics and text and may be supported by a range of features including embedded thesaurus, grammar and spell checking, these solutions tend to focus on the content's form, but lack mechanisms to support improving authoring of the content quality. The existing document authoring tools are generally not aware of author's identity and content's semantics and can do little to support quality authoring.

In one aspect, the presented disclosure takes user information (for example, identity, profile and produced content) supplemented with data from sensors and capture devices as input. Examples of such captured data may include but are not limited to, eye-tracking, gesture and facial expressions. Whether working in the collaborative authoring mode or in the single authoring mode, each author is authenticated, for example, by using a login with username and password, or alternatively by facial recognition, retina scan, another biometric recognition, or other identification mechanism, for example, according to the hardware that is available.

FIG. 1 is a diagram showing components of a system in one embodiment of the present disclosure. In one embodiment, author's input data is processed by four modules: Template Processing 102, Authoring System 104, Search Engine 106 and Cognitive System 116. The modules are computer-implemented components that execute on one or more hardware processors or devices. All four modules 102, 104, 106, 116 are interconnected and use functionalities of each other. The components of the system may be connected via a network 114 such as a computer network, wired or wireless.

The module for template processing 102 is responsible for verifying whether the authored content is semantically consistent with predefined and inferred rules in the form of templates. Semantic templates may describe concepts that must be addressed in a given document type. For example, in a semantic template corresponding to a patent document, topics such as detailed description and claims may be specified as being mandatory. By inferring concepts from authors' content, the system is able to check if constraints from the corresponding template are being met. Template processing 102 takes the form and the semantics of the document being authored into account. For instance, the document authoring of the present disclosure in one embodiment allows an author to define a document template associated with a context, for example, document templates may be defined for different contexts, such as for legal documents, technical reports or scientific articles. Each of these groups has specific rules and styles that are respected.

The authoring processing system 104 suggests actions and content, taking into account the content's current version and semantics, authors' literary styles, gestures, facial expressions, attention detection inferred from eye and head tracking, and preferences, as well as content previously created and related content fetched through the search engine module 106.

Databases 108, 110, 112 connected through a local and/or remote network, e.g., via 114, allow respectively storage of style and authoring templates 108, previously generated documents 110 and knowledge 112 created during authoring. The knowledge database 112 is responsible for storing the knowledge (e.g., all the knowledge) extracted from the symbiosis between authors, content and computing system.

The computer-implemented document authoring of the present disclosure allows users to interact with the authoring system 104 in the WYSIWYG or in a conversational mode. For example, a WYSIWYG and/or conversational user interface may be provided that functions with the template processing 102, authoring system 104 and search engine 106 modules and template 108, document 110 and knowledgebase 112 databases to reuse, fetch and suggest (proactively and/or reactively) new content and corrections to an author using a dialog and conversational system. In one embodiment the dialog and conversational user interface may be implemented as a sub-module of the authoring system 104. Similarly, an author may request and accept suggestions in natural language, promoting a better user experience. As authors accept or reject suggestions from the authoring system 104, the knowledge base 112 is fed, allowing the knowledge base 112 to become increasingly specialized to authors' preferences. The authoring system 104 also registers details about authors' reactions and expressions in the knowledge base. In one embodiment, the system infers the authors' current focus and concerns, and physical and psychological states, in order to enhance productivity. For instance, increasing or decreasing the amount of suggestions when the cognitive system is able to detect that authors are rested and energized or exhausted. During the authoring process, the authoring system 104 continuously checks for pre-defined milestones and goals, narrative evolution, subjects that should be covered, and writing styles. In case of detecting inconsistencies, it may suggest changes accordingly.

A cognitive system 116 is provided that supports inferring of semantics and content structuring, giving suggestions and guiding users in authoring processes. In one embodiment, the modules 102, 104, 106 and 116 may function as follows. The module for template processing 102 is responsible for verifying if the authored content is semantically consistent with templates, which can be predefined by authors or inferred from the current document. The authoring system 104 is in charge of suggesting actions and content, taking into account data such as: content's current version and semantics; authors' literary styles; user's gestures, facial expressions and attention inferred from the cognitive system 116. The cognitive system 116 uses data from repositories and data captured by available devices, for example, eye and head tracking and other devices; user preferences; as well as content previously created and fetched from the search engine 106 module. The cognitive system 116 uses these data and may also use author's feedback to enhance its learning capabilities. The cognitive system 116 comprises AI features and techniques, for example, for reinforcement learning, supervised and unsupervised learning. Search engine 106 can be used by the cognitive system 116 to fetch content from local available repositories and remote repositories (e.g., including local area network and Internet). Definition of semantic and style templates that can be stored in repositories to guide authors during content production may be stored as one or more templates. Templates can be defined by authors through explicit rules and/or be inferred from the current document by the cognitive system 116. Examples of explicit rules include the definitions present in academic papers templates, legal documents and technical reports. As an example of inferring a template, during the writing process, as the author inputs content creating a specific document structuring, the cognitive system 116 can compare the current structure with known rules to classify it, suggesting an appropriate template. The cognitive system 116 learns user characteristics (e.g., styles, preferences) to make better suggestions and content understanding. In one embodiment, the cognitive system 116 is in charge of suggesting relevant content (retrieving data from knowledge base, document repositories, template repositories, and search engine). The authoring system 104 uses the cognitive system 116 so that it can classify and present relevant information to authors.

Figure 2:
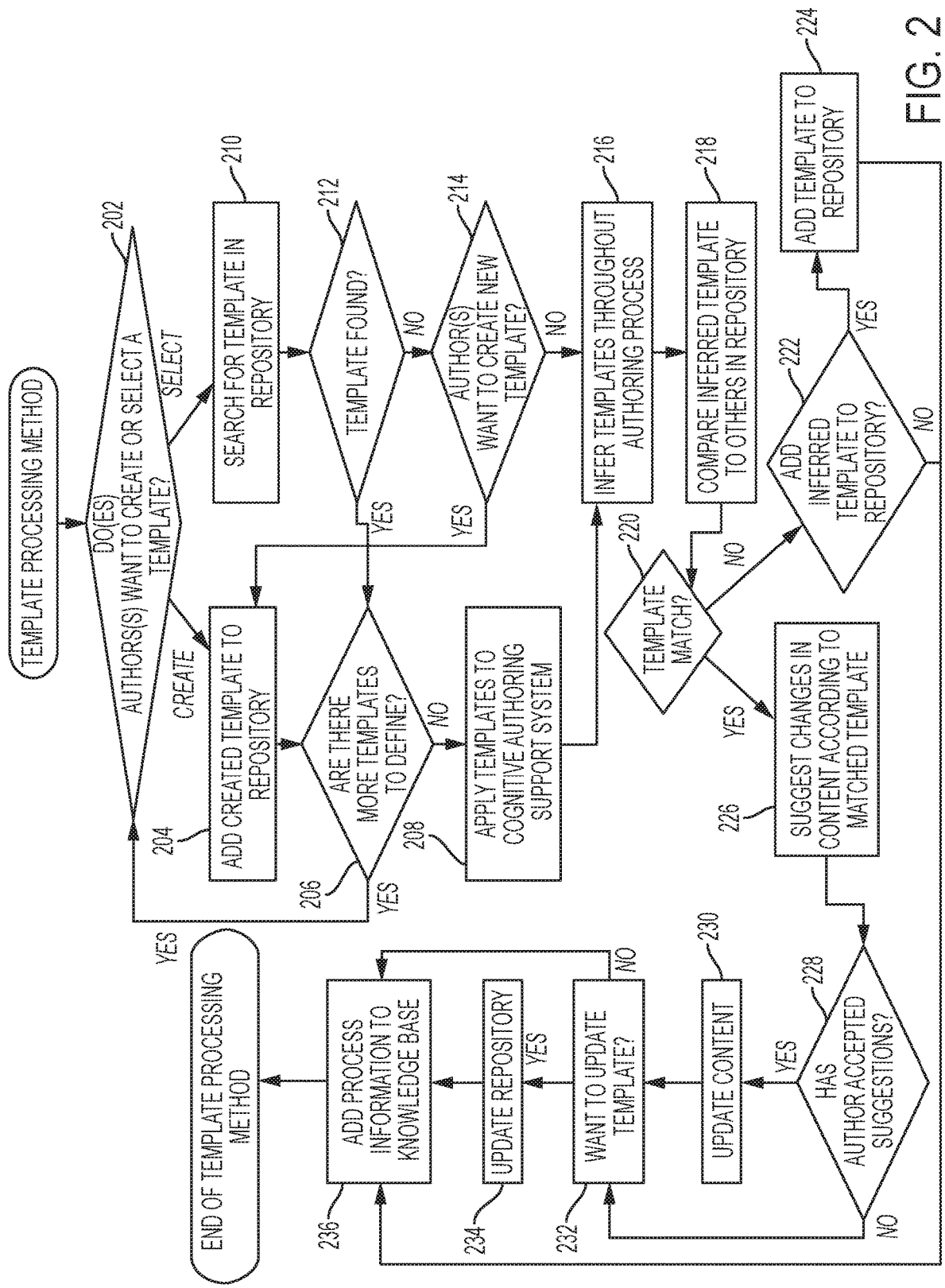
FIG. 2 is a flow diagram illustrating a method that processes templates in one embodiment of the present disclosure.

FIG. 2 is a flow diagram illustrating a method that processes templates in one embodiment of the present disclosure. At 202, a user interface presents options to a user to create or to select a template. For instance, the options may be displayed in a form of a selectable menu items on a display screen. The flow logic shown in FIG. 2 with respect to template processing and the flow logic shown in FIG. 3 with respect to authoring process may run in parallel.

At 204, responsive to the user selecting a create template option, a template is created and added to a repository, for example, a template repository. These templates may have styling and semantic structuring rules. For instance, these rules may define expected visual representation (e.g., two columns, authors and their affiliation on top of the page). Semantic rules can be defined by authors who want to specify milestones and/or broad subjects that should be covered in the document. By using those semantic rules, the cognitive system 116 may check for predefined milestones and goals, narrative evolution and subjects that should be covered. Rules are expressed in a given notation, which may be extensible markup language (XML), subject-predicate-object (SPO) triples, and/or others.

At 206, it is determined whether there are more templates to define, for example, based on user interaction, via a graphical user interface (GUI) which takes user input. For instance, a user may specify, on the GUI whether to create another template.

If there are more templates to define, the processing returns to 202. Otherwise, the processing continues to 208. At 208, the created template or templates are applied to the authoring system (e.g., 104 in FIG. 1). For instance, applying templates includes adapting the current document according to template rules (e.g., visual styles and semantic structure). The processing then proceeds to 216.

At 210, if the user chose to select a template, a selected template is searched for in the template repository. In one embodiment, a template may be inferred automatically (automatic inference) without a user explicitly selecting a template, based on template rules matching the content of the current document.

At 212, if the template that is searched for is found in the template repository, it is determined at 206 whether there are more templates to define. If so, the processing returns to 202. If at 212, no templates are found, it is determined whether a new template should be created, for example, by prompting the user at 214. If the user selects to create a new template at 214, the processing continues to 204 to create and add the create template to the template repository.

If at 214, the user selects not to create a new template, a template or templates may be inferred throughout the authoring process or session at 216. For example, by comparing the current document structure and content with known rules to classify it, an appropriate template is suggested automatically.

At 218, the template that is inferred at 216 is compared with other templates in the template repository. For example, the processing automatically compares concepts present in text and visual data (content semantics), styling definitions, document structuring (e.g., chapters, sections) that are being authored, to the concepts and structuring defined in existing templates in the template repository.

At 220, it is determined whether a template that matches the inferred template is found in the template repository. In one embodiment, a match is characterized by a relevant amount (a defined threshold) of content semantics, styling definitions and/or document structuring conforming to what is specified in a given template definition. If the authored content happens to match a template definition, the template processing would suggest its application to the document.

If at 220, it is determined that no matching template is found, a prompt is displayed or presented to the user at 222, to ask whether the inferred template should be added to the template repository. If the user inputs that the template is to be added to the template repository, the template that is inferred is added to the template repository at 224. On the other hand, if the user inputs that the template is not to be added to the template repository, the logic of the flow proceeds to 236.

If at 220, it is determined that a matching template is found, suggestions for content change is determined based on the information found in the matching template. For instance, content that is entered for current document authoring and the currently entered style or format of the document may be accessed. The current document's content and style may be compared with those found in the matching template. The template processing in one embodiment may check for addressed topics in content (semantics), styling and structuring in the current document, for suggesting content enhancement, replacement and/or insertion as determined from the matching template.

At 226, the suggestions may be provided to the user via the user interface of the document authoring. For example, if the currently being authored document has different content or style from the matching template's defined content and/or style, a suggestion may be provided to change the content and/or style to those found in the matching template. In one embodiment, the authoring system (e.g., FIG. 1 at 104) may perform this step, e.g., using features from the template processing component.

At 228, it is determined whether the user has accepted the suggestions. For example, the user interface providing the suggestions may also include an input field for the user for indicating whether to accept the suggestions or not.

At 230, if the user has accepted the suggestions, the content is updated automatically according to the suggestions. For example, the current document being authored is automatically updated with the suggested content enhancement, replacement and/or insertion as determined from the template (e.g., inferred or explicitly selected). The logic of the template processing proceeds to 232.

If at 228, it is determined that the user has not accepted the suggestions, the user is not accepting the suggestions, the logic of the template processing proceeds to 232.

At 232, the user interface prompts the user to ask whether the template (matched template) should be updated. If the user answers no, the logic of the template processing proceeds to 236. On the other hand, if the user answers that the template is to be updated, at 234, the template found in the template repository is updated and stored back in the template repository. For instance, the user (author) may update the template definition, specifying different topics that should be covered, styling and structuring rules. This template definition (also referred to as template modeling) may be materialized through different languages or notations. For example, a XML, JavaScript Object Notation (JSON) and/or other intermediary representation using subject-predicate-object (SPO) triples, such as Resource Description Framework (RDF) and/or Web Ontology Language (OWL) may be used to define specific aspects of the template.

At 236, process information is added to a knowledge base. In one embodiment, all aspects that were accepted and/or rejected by the author (such as new content, styling and structuring modifications) are stored as knowledge in a knowledge base. This information may be used as a feedback for learning algorithms, for enhancing future suggestions.

The authoring system in one embodiment is in charge of supporting user interaction throughout authoring. The authoring system uses functionalities from template processing to check whether a template exists or not for the current content. The features of the authoring system and the template processing may overlap, specifically (308 in FIG. 3 and 226 in FIG. 2). In one embodiment, the suggestions of the processing at 226 in FIG. 2 may be based specifically on template definitions. In one embodiment, the authoring system (e.g., shown at 308 in FIG. 3) may suggest enhancement based on other aspects, such as previously authored documents, facts in knowledge base and documents retrieved by using the search engine module.

Figure 3:
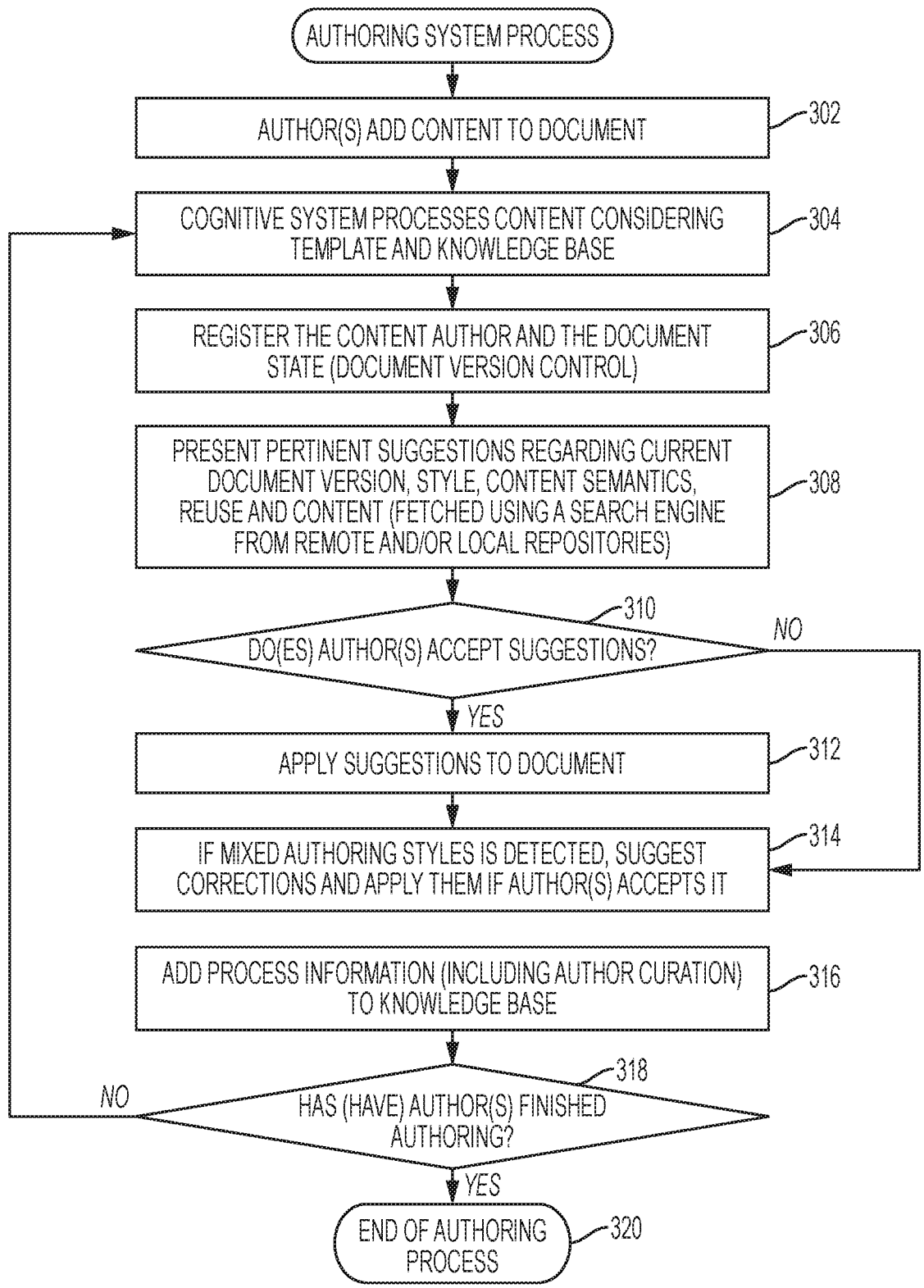
FIG. 3 is a flow diagram showing a process of the authoring in one embodiment of the present disclosure.

FIG. 3 is a flow diagram showing a process of the authoring in one embodiment of the present disclosure. A document authoring of the present interface may include a user interface via which a user may author a document, for example, by creating a document and adding content to the document. The user interface receives data or content input by the user at 302. For example, a user (e.g., author) creates or opens a document and adds content. The user interface detects this action and the content.

At 304, a cognitive system processes the content considering template and knowledge base. This processing in one embodiment involves considering result of the process for template processing and facts present in the knowledge base. Both processes for authoring and template processing may occur or run in parallel. The cognitive system may analyze content through artificial intelligence (AI) techniques such as natural language processing (NLP) and computer vision (CV), also considering possible templates and previous user preferences and facts from the knowledge base.

At 306, the content author and the document state (e.g., document version number) may be registered. For instance, the authoring system may register this information in a knowledge base (e.g., 112 in FIG. 1). The authoring system may access the knowledge base and persist (or store) information, for example, represented in tables, subject-predicate-object (SPO) triples, or other type of storage technology.

At 308, suggestions regarding current document version, style, content semantics, reuse and content are presented. The authoring system performs this step, taking into account information from the other modules. For example, the suggestions may be based on aspects determined by the template processing with respect to template definition, consistency with previous authored documents and information fetched from search engine (e.g., 106 in FIG. 1).

At 310, it is determined whether the user has accepted the suggestions made at 308, for example, via the user interface. For instance, the user may input that the user is accepting one or more or all of the suggestions. Examples of suggestions may include changing specific styling, structuring aspects, replacing content with another, removing content, suggesting new content to be added.

At 312, if the user has accepted the suggestions, the suggestions are applied to the document. The authoring system may add, remove or replace specific content(s) and/or styling and/or structuring as suggested into the document.

At 314, if mixed authoring styles are detected, corrections may be suggested. Algorithms for NLP such as word embedding may be applied to infer if words and sentences are more likely used by authors considering their profiles and writing history or words and expressions that should be used for specific templates (academic, legal). If, for example, the user accepts the suggested corrections, the corrections may be automatically applied to the document. Examples of mixed styles may include, authors using contrasting expressions (e.g., British and American), mixing passive and active modes, inconsistencies with first person and third person narratives, colloquial and formal narratives. For example, for each word in the document the authoring system detects whether the usage of the word is consistent with the whole document and template definition. Such detection may be inferred through AI and NLP mechanisms.

At 316, process information is added to the knowledge base (e.g., FIG. 1 at 112). The process information may include whether the author accepted or rejected the suggestions, for example, in correcting mixed styles or other inconsistencies in the document. For example, the authoring system may infer what are the author's preferences concerning the detected situation. To make future suggestions, this feedback (stored or added to the knowledge base) is taken into account.

At 318, it is determined whether the user has finished the authoring process. If so, the logic ends at 320. Otherwise, the logic proceeds back to 304.

Figure 5:
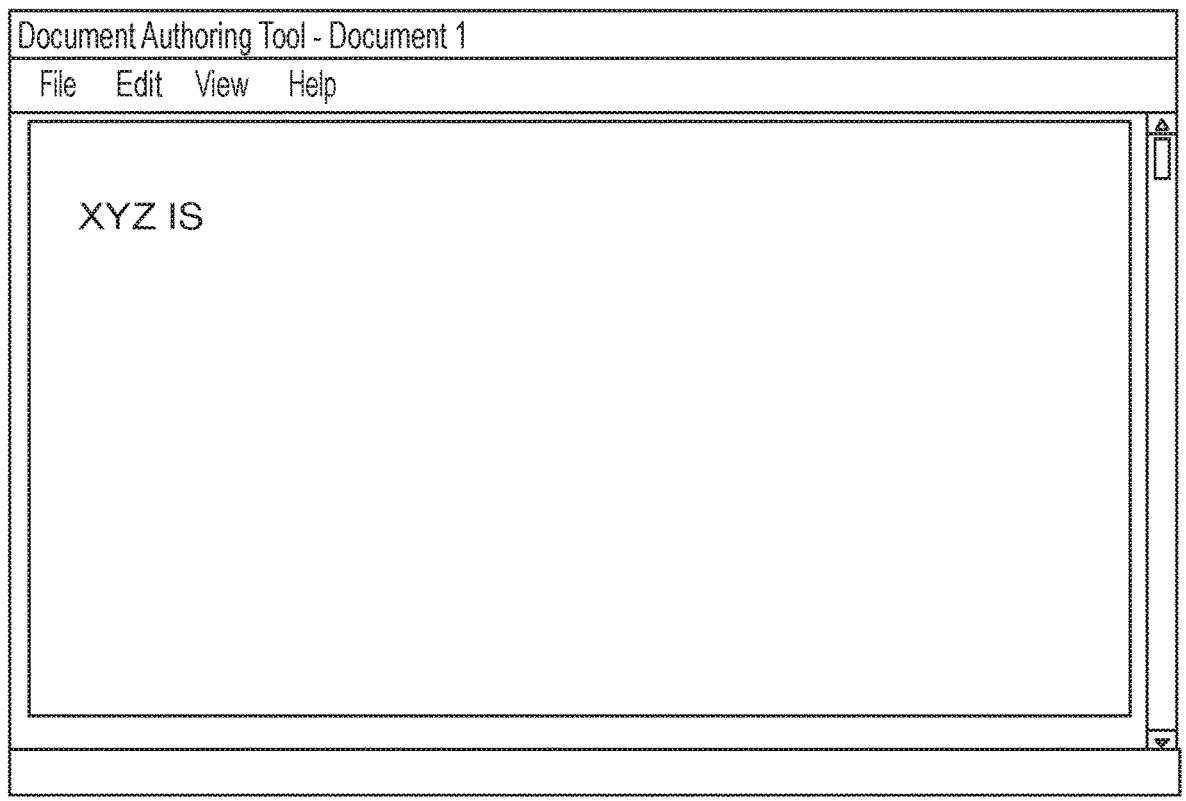
FIG. 5 illustrates an example screenshot of a document editor in one embodiment of the present disclosure.

The following describes an example use case of a cognitive computing system that assists in document authoring. A user interface may provide a document authoring or editor screen into which a user may enter content. An example screenshot of a document editor is shown in FIG. 5. Consider that an author is writing an article about "XYZ" topic. As soon as the author starts to write, the cognitive system immediately recognizes the subject and starts to retrieve information about the detected concept.

Figure 6:
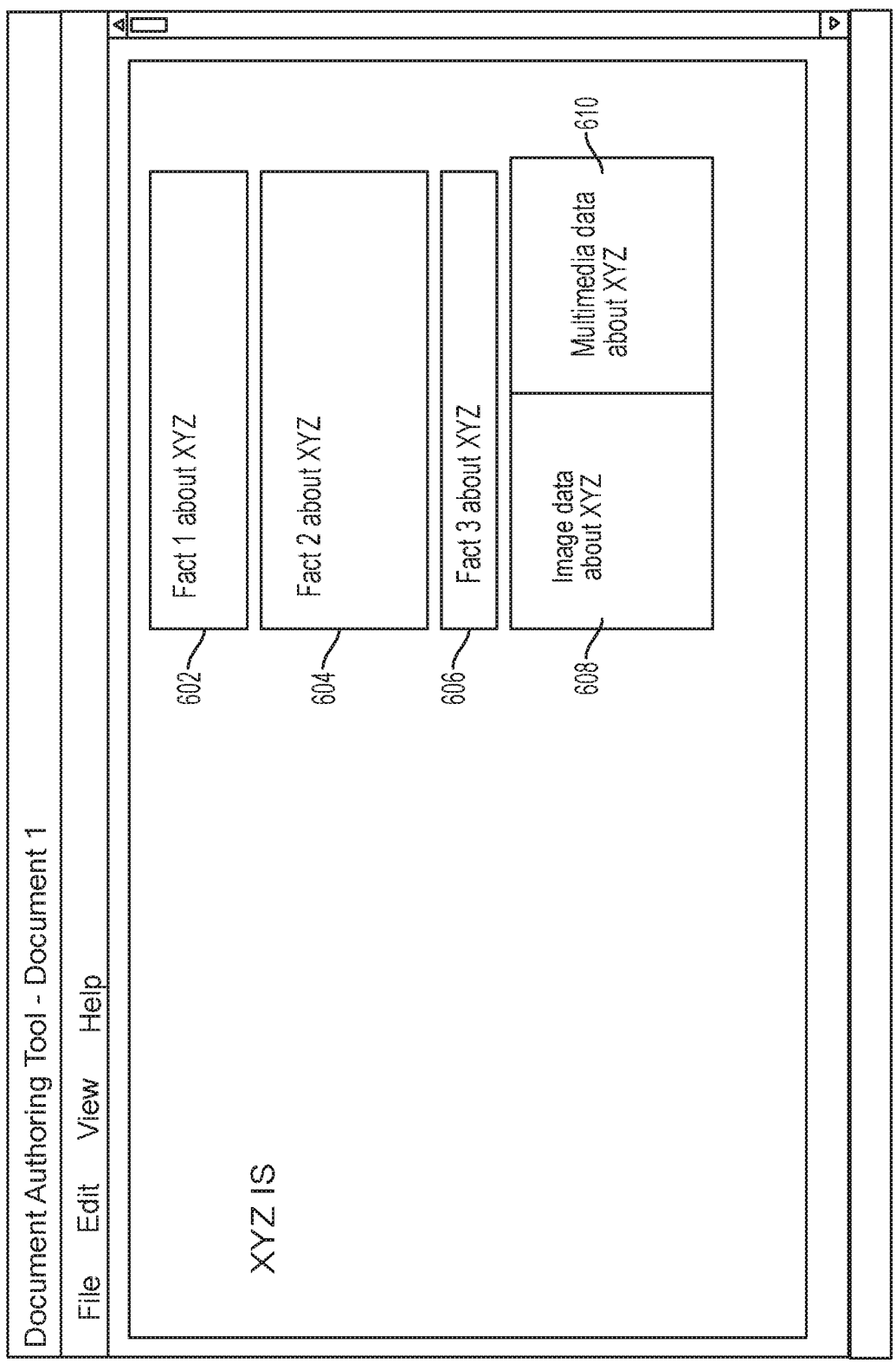
FIG. 6 shows an example screenshot of the document editor populated with information the cognitive computing system has determined about the concept.

After evaluating the fetched information about the inferred concept, the cognitive computing system may immediately rank and present information related to it. Topic and concept recognition may be performed through AI techniques, such as Natural Language Processing (NLP) for text processing and Computer Vision (CV) for visual content. Broader concepts may be formed, by aggregating different actors and objects in a specific image. For instance, a group of people throwing a ball may be recognized as a sports match. FIG. 6 shows a mockup of the document editor user interface populated with information the cognitive computing system has determined about the concept, which may be displayed via the user interface on a display device. For instance, a user (author) may be presented with a plurality of options, one or more of which a user may select to complete the author statement, e.g., as shown at 602, 604 and 606. The cognitive computing system may also handle and present image 608 and/or multimedia data 610, e.g., including pictures, video, audio, about the concept or subject, which the user may select to include in the document. In one embodiment, the cognitive computing system of the present disclosure invokes or executes a search engine to search for the information regarding the inferred concept, which for example, is populated on the document editor display screen. The information may be in the form of text and multimedia.

Figure 7:
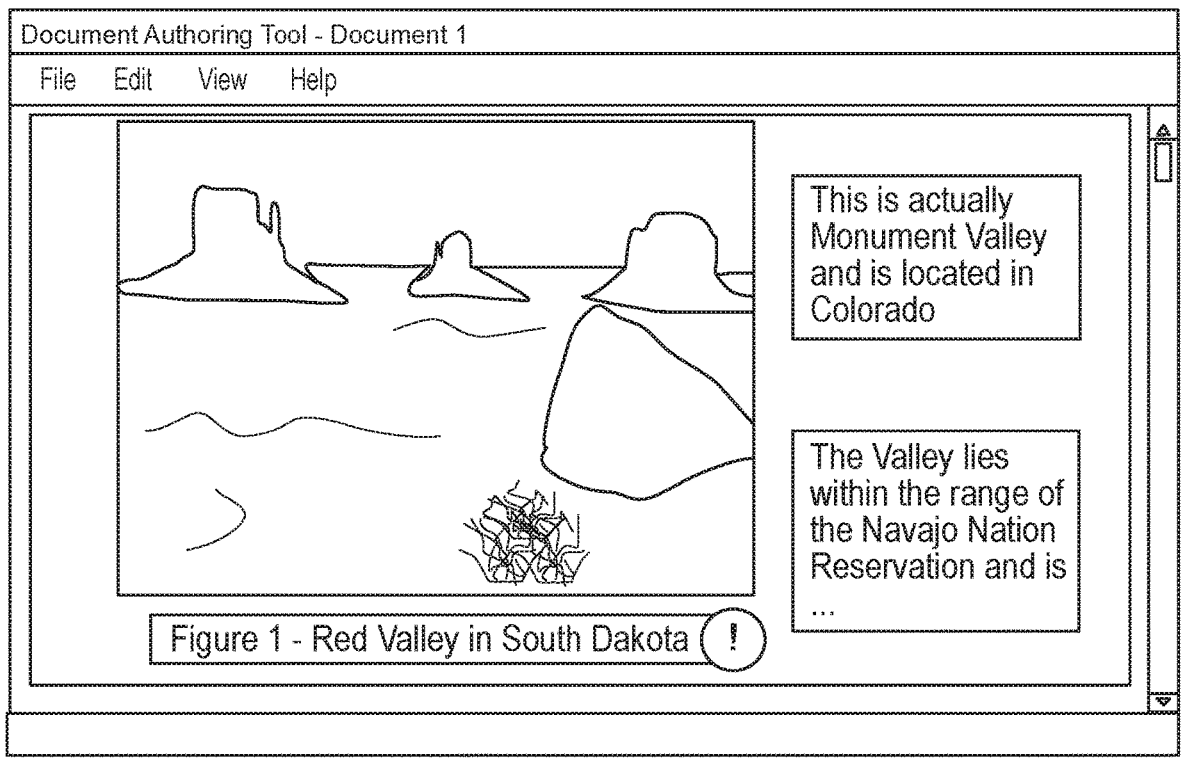
FIG. 7 shows an example screenshot of the document editor in one embodiment of the present disclosure, in which the cognitive computing system monitors types of content entered by the user and performs inconsistency checks, notifying the user of potential inconsistencies in the document.

FIG. 7 shows a mockup of the document editor in which the cognitive computing system monitors types of content entered by the user and performs inconsistency checks, notifying the user of potential inconsistencies in the document. For example, the cognitive computing system may be able to handle multimedia data e.g., transcoding to different formats, coping with multiple modalities (fusion and fission) . The cognitive system may monitor different types of content added by authors. The cognitive computing system is able to suggest new content, and it can also check for contextual inconsistencies in the document. For instance, in FIG. 7, the author has described the shown image as a picture of red valley. The cognitive computing system of the present disclosure analyzes the image and determines that the image does not pertain to a picture of red valley, and assists a document author to handle this inconsistent situation. For example, the cognitive system extracts content semantics, e.g. concepts and topics detected from pictures and textual content, correlating the information and inferring potential inconsistencies. The cognitive system may infer inconsistencies by checking whether detected concepts and topics expressed in content are consistent to what is being described throughout the document. For example, if a picture of Monument Valley is in the document, but text is referring to it as Red Valley, this is potentially an inconsistency. AI techniques such as CV and NLP may be applied for detecting semantics in visual and text content.

In the example shown in FIG. 7, the cognitive computing system recognizes that the image refers to Monument Valley and not to Red Valley as entered by the author. For instance, the cognitive computing system may compare the entered image with a verified image of Red Valley. Responsive to discovering the inconsistency, the cognitive computing system may suggest to complement the picture description with additional information, e.g., as shown at 702 and 704.

As the author accepts or rejects suggestions the cognitive computing system makes, the cognitive computing system becomes increasingly specialized to the author's preferences and writing style. User feedback is used to refine (curate) AI algorithms that are trained considering these examples among other data. The more the user (author) provides feedback, the more relevant it will be in statistical analyses from these algorithms.

Templates such as semantic and style templates may be defined and stored in a repository to guide authors during content production. A template may be defined by an author by providing explicit rules, and/or be inferred by the cognitive computing system from the current document the user is authoring.

Figure 8:
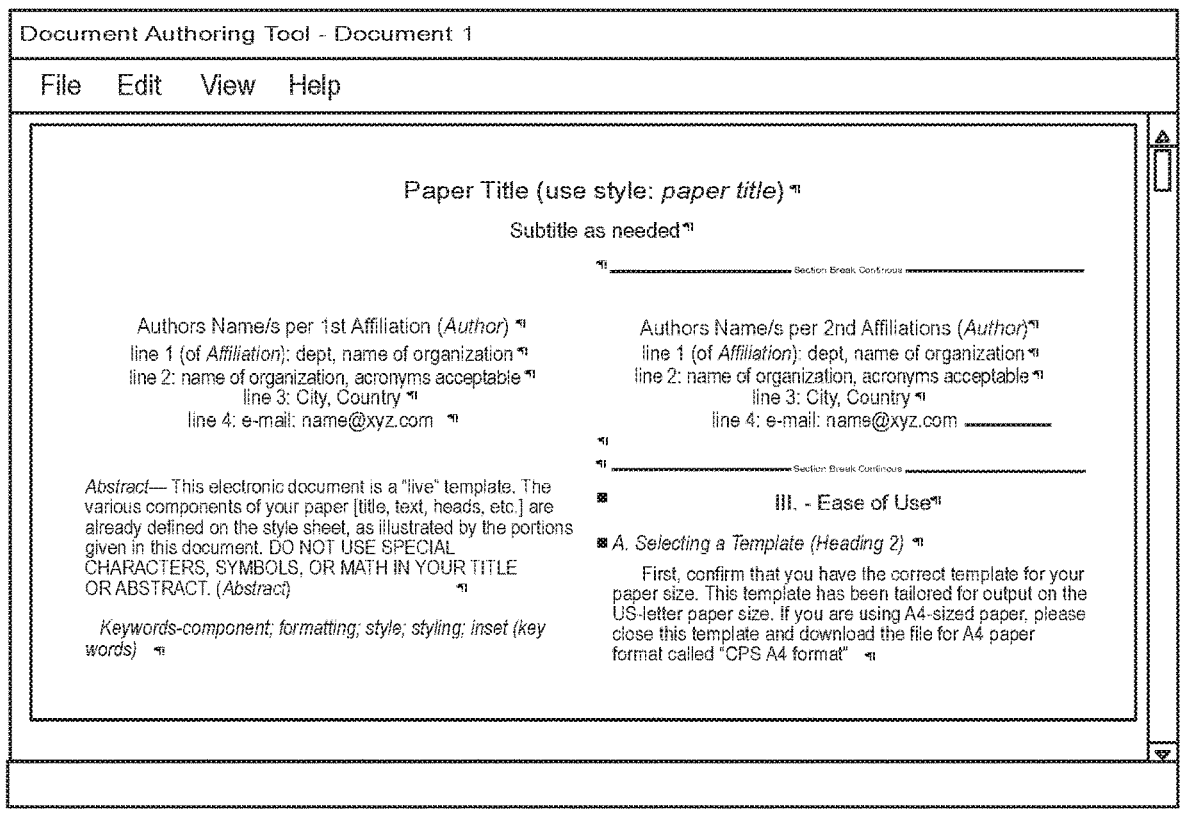
FIG. 8 illustrates a sample style template in one embodiment of the present disclosure.

FIG. 8 illustrates a sample style template in one embodiment of the present disclosure. This example template defines that text should be placed in two-columns, authors and their affiliation on top of the page. The cognitive computing system may assist authors to maintain their documents consistent with styling requirements. Whenever the system perceives that formatting rules are being broken, it may alert users suggesting them with style and content changes or actions to keep the document according to style templates. For example, the cognitive computing system may compare a selected template's style with the current document's style as the user formats the content in the current document. Responsive detecting an inconsistency between the two, an alert may be signaled.

Figure 9:
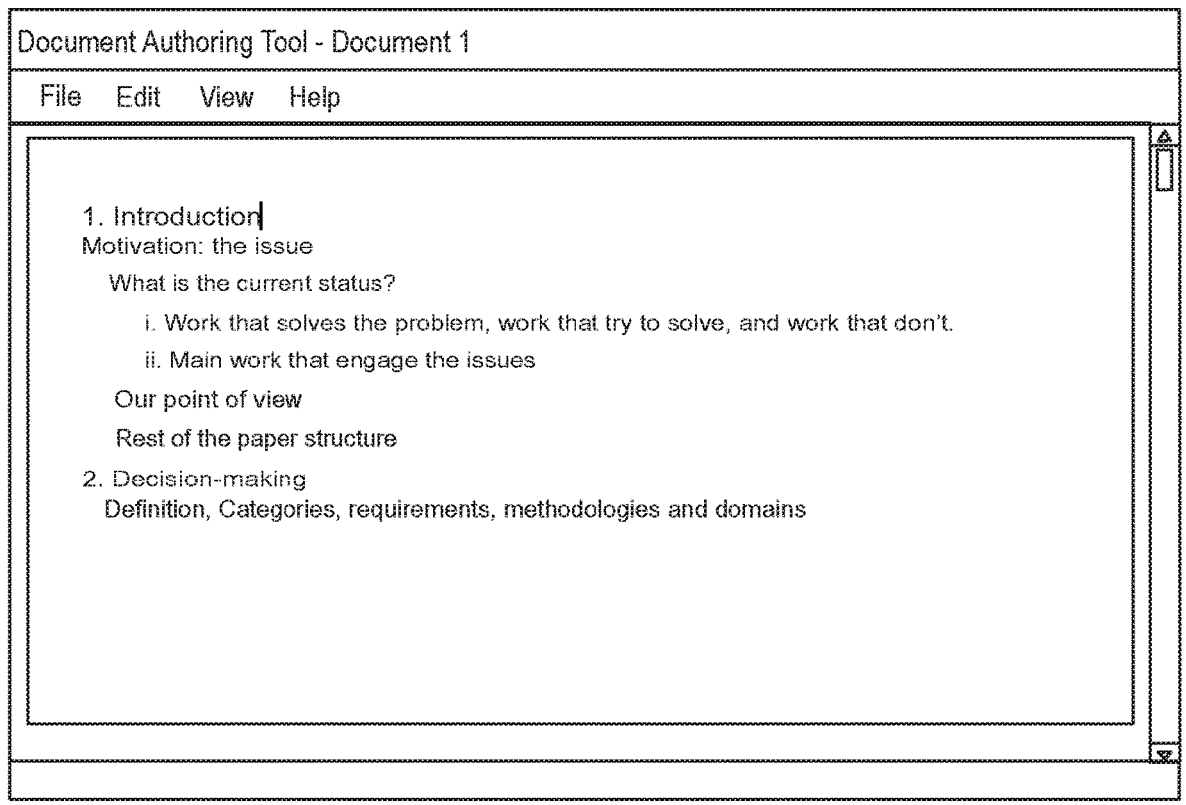
FIG. 9 illustrates a sample semantic template in one embodiment of the present disclosure.

FIG. 9 illustrates a sample semantic template in one embodiment of the present disclosure. A semantic template can be defined, for example, by authors, specifying milestones and/or broad subjects that should be covered in the document. By using a semantic template, the cognitive system may check for pre-defined milestones (required topics or sections) and goals, narrative evolution and subjects that should be covered during document authoring.

Figure 10:
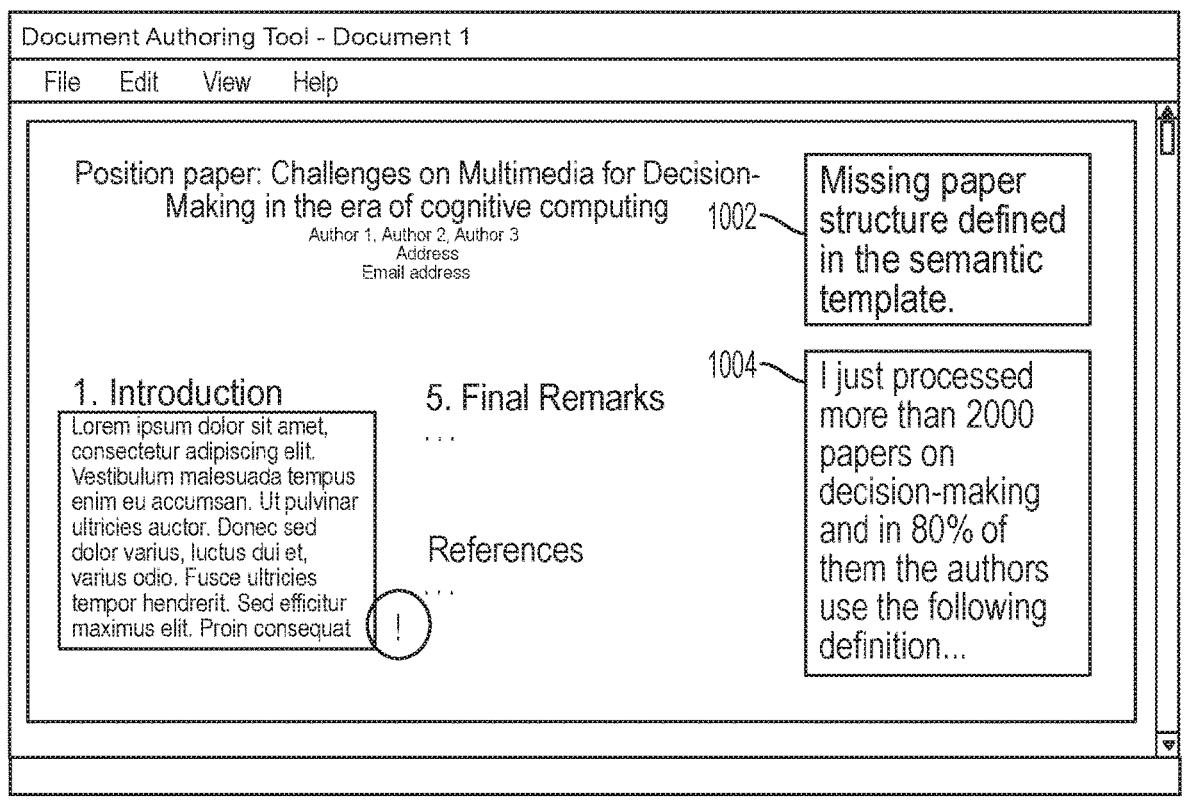
FIG. 10 illustrates an example screenshot of a document editor in one embodiment of the present disclosure.

FIG. 10 illustrates an example user interface display of a document editor in one embodiment of the present disclosure. Taking into account a semantic template definition (e.g., shown in FIG. 9), the cognitive system may alert an author that there are critical missing goals. For example, a notification 1002 is displayed in the editor to notify that the current document is missing paper structure defined in the semantic template. The cognitive computing system may also contrast the current content with fetched information and make suggestions based on concept and content analytics. In the example, the cognitive computing system found that eighty percent of the analyzed papers include a common topic discussion strategy as shown at 1004.

Figure 11:
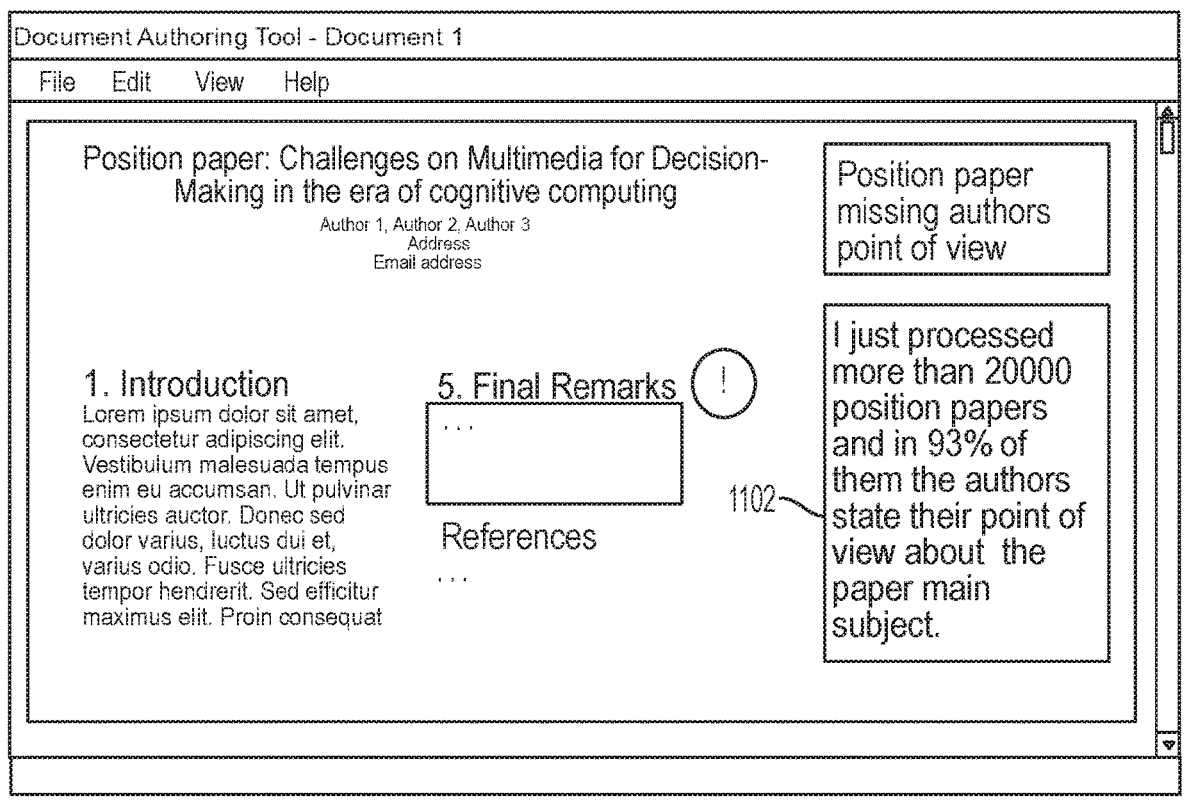
FIG. 11 illustrates another example screenshot of a document editor in one embodiment of the present disclosure.

By correlating the semantic and style template definitions, the cognitive computing system is also able to present richer suggestions. FIG. 11 illustrates another example screenshot of a document editor in one embodiment of the present disclosure. In this example, the system infers that the current document is a position paper. For example, by any hints such as the "Position paper" in the title, the system may infer that the document is a position paper. As another example, by searching remote repositories and verifying that the main addressed topic in the paper is not discussed in the literature, the system may infer that the current document is a position paper. The cognitive computing system suggests, for example, as shown at 1102, that it should comprise specific directions and information. The suggestions may be determined by correlating data fetched from repositories and applying NLP and other statistical analysis.

In one embodiment, the cognitive computing system continuously senses and learns user characteristics to make better suggestions and content understanding. For example, as authors accept or reject suggestions, the cognitive computing system becomes increasingly specialized to authors' preferences and writing style.

Figure 12:
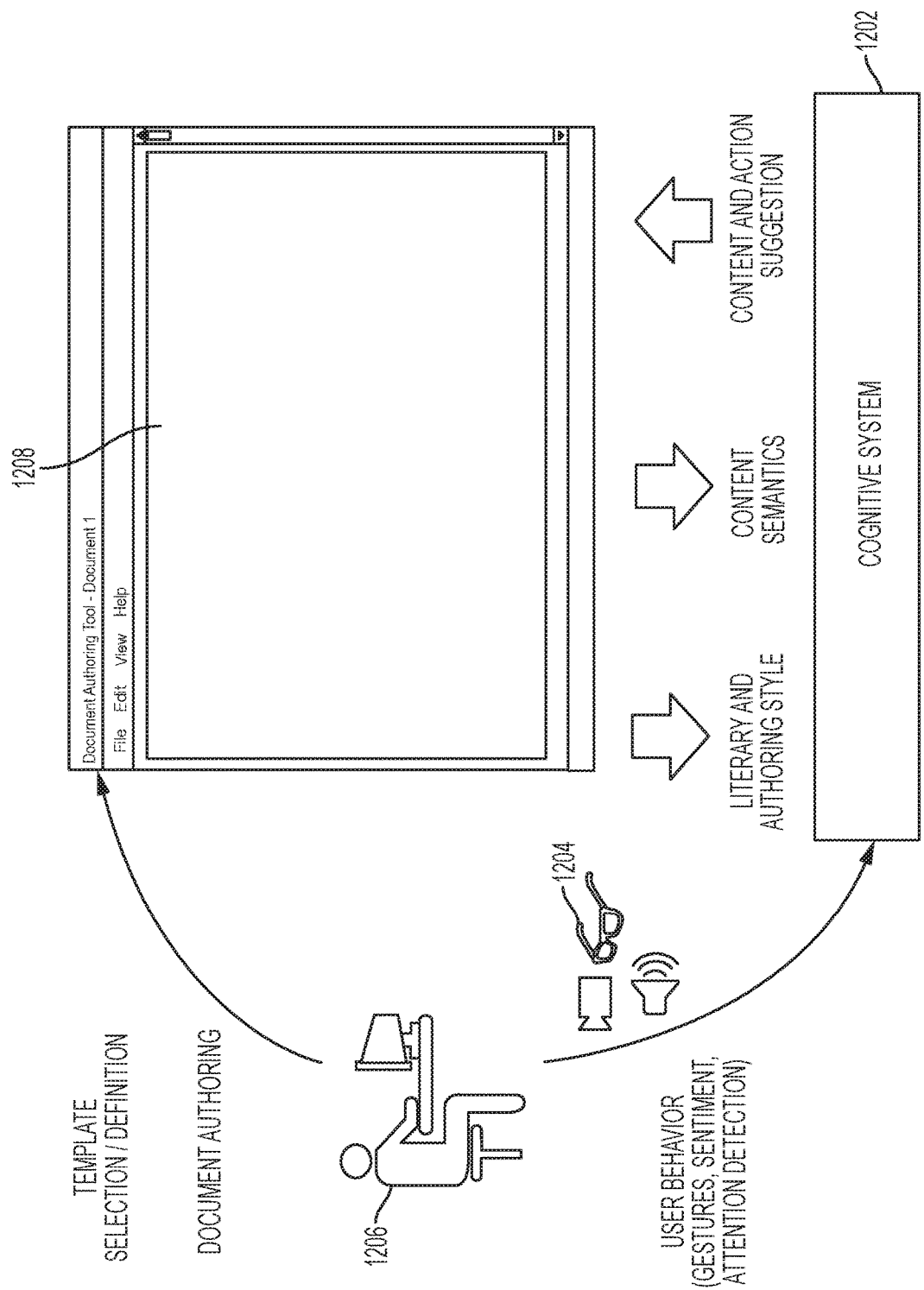
FIG. 12 shows an overview of human-machine symbioses during authoring processes in one embodiment of the present disclosure.

FIG. 12 shows an overview of human-machine symbioses during authoring processes. The cognitive computing system 1202 in one embodiment perceives author behaviors through multiple available capture devices 1204, for instance, while a user is authoring a document via an authoring tool or software (e.g., shown at 1206). The system 1202 may detect user sentiment and physical state to avoid cognitive-intensive suggestions when the user is detected to be tired. As another example, the system may analyze user's physical state and working hours to determine the best time to suggest specific content. For example, by detecting authors' physical state, the system may avoid suggesting content that would be cognitively demanding when the user is detected to be tired. In this case, the system may also suggest that the author take a break. As another example, the system may detect if the user is reflecting about an aspect that could reveal that a topic should be further extended. The system may find further narratives, for example, via a search engine searching for additional content or information on that topic, and automatically suggest the additional content to extend the topic. The cognitive computing system 1202 analyzes content semantics in the document being authored 1208 in order to infer literary and authoring styles and to learn user preferences. Based on the analysis, the cognitive computing system 1202 suggests optimal content and actions to enrich the document authoring experience.

The current authoring solutions propose basic author identification through login. In one embodiment, the document authoring through cognitive computing of the present disclosure provide user detection using available hardware, and continuously capturing of author information. Current solutions are unaware of users and content semantics, while the document authoring through cognitive computing of the present disclosure provides learning from authors and content to make better suggestions and content understanding. Current solutions offer limited support such as spelling and grammar checking, while the document authoring through cognitive computing of the present disclosure provide explores content understanding through machine learning and artificial intelligence techniques, offering features such as control of narrative evolution, consistency checking, authoring styles, milestones and subjects that should be covered.

A document authoring methodology of the present disclosure provides a cognitive assistant for document authoring. For example, the document authoring through cognitive authoring of the present disclosure may sense and learn from author's expressions, sentiments, user input, and other user behavior, detected while a user is authoring a document via a document authoring user interface. Learning may be performed also from previously created documents, semantic and style templates. For instance, the document authoring through cognitive computing of the present disclosure in one embodiment implements and employs style and semantic template. The templates may be defined by author specification and/or by inferring from a document being authored. The document authoring through cognitive authoring of the present disclosure in one embodiment provides for automated consistency checking of document content (e.g., syntax and semantics) and automated consistency checking of document according to style templates (e.g., legal documents, academic papers). The document authoring through cognitive authoring of the present disclosure in one embodiment may detect literary style, e.g., including for collaborative authoring.

The document authoring through cognitive authoring of the present disclosure in one embodiment provides for enhancement of productivity when producing document in different domains such as legal documents, technical reports, scientific production of research groups, papers, patents and other scientific artifacts, and artistic or literary publishers.

The document authoring through cognitive authoring of the present disclosure in one embodiment may enhance word processor tools for improving those tools to be able to efficiently author documents. The document authoring through cognitive authoring of the present disclosure in one embodiment provides suggestions and assessment of content's semantics; control of the narrative evolution and authoring styles, and control of milestones and subjects that should be covered.

One or more components of a system in the present disclosure may be implemented in conjunction with a cloud computing environment, although not limited to that environment. For instance, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
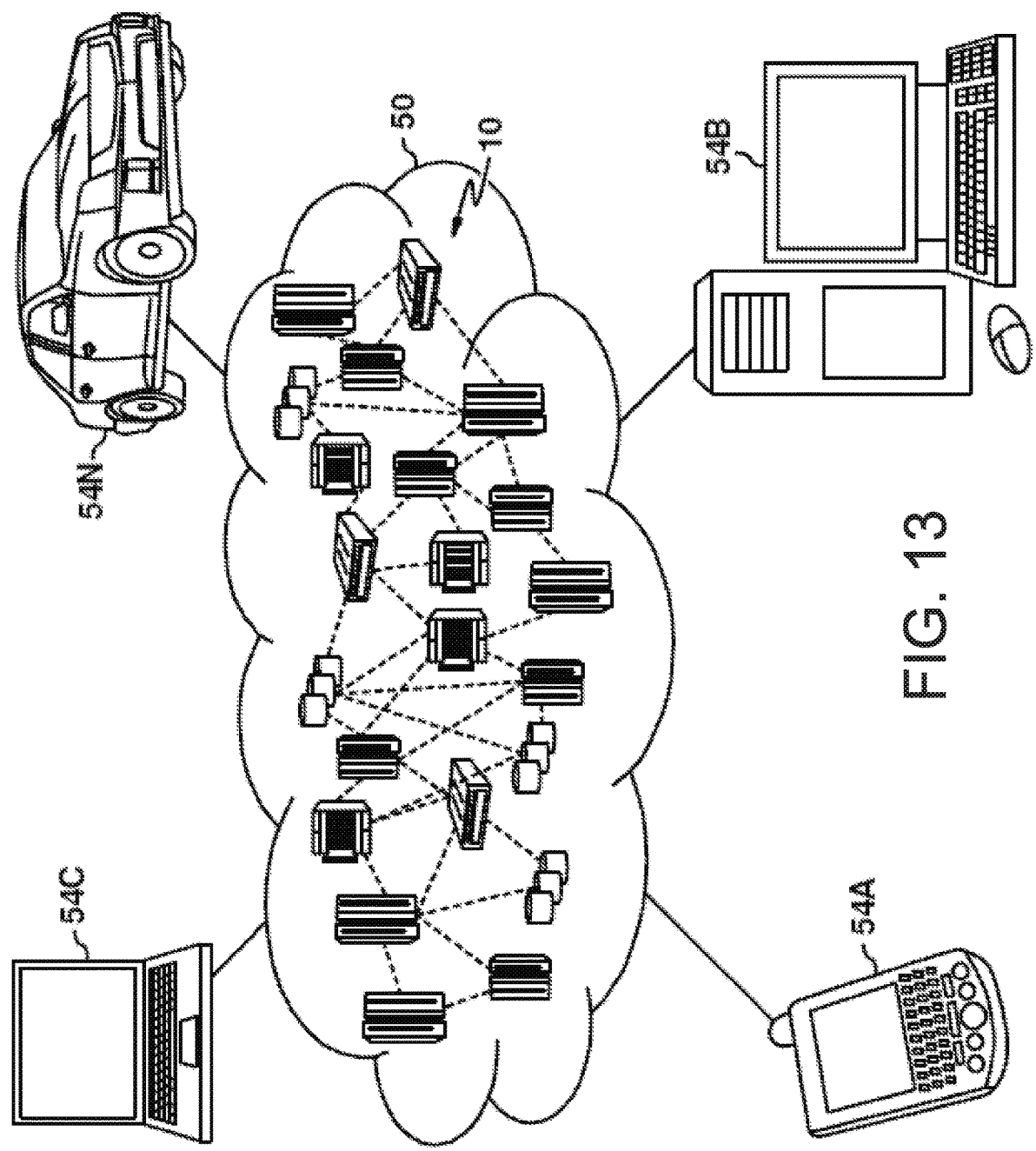
FIG. 13 illustrates cloud computing environment in one embodiment of the present disclosure.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
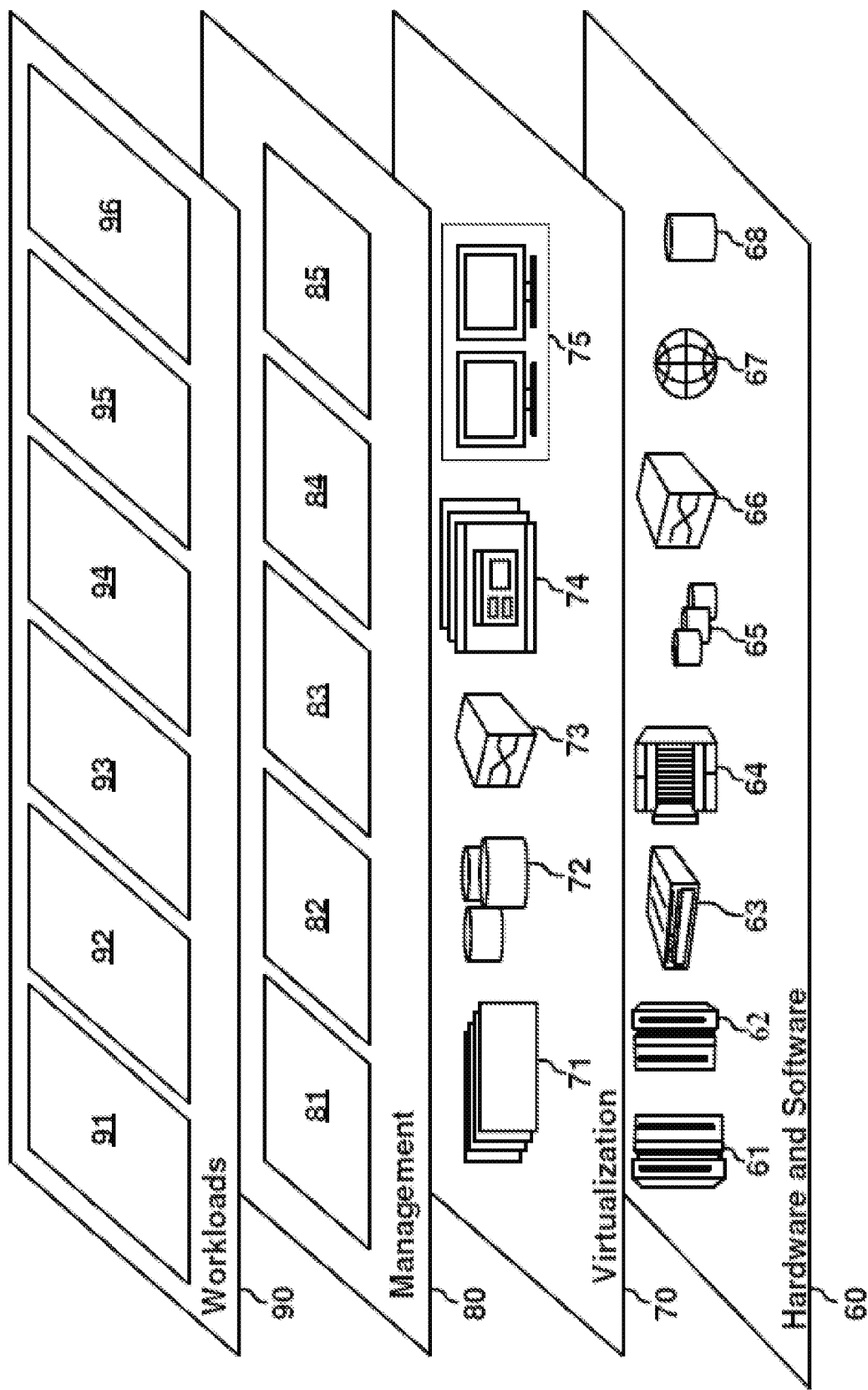
FIG. 14 illustrates a set of functional abstraction layers provided by cloud computing environment in one embodiment of the present disclosure.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document editor assistance processing 96.

Figure 4:
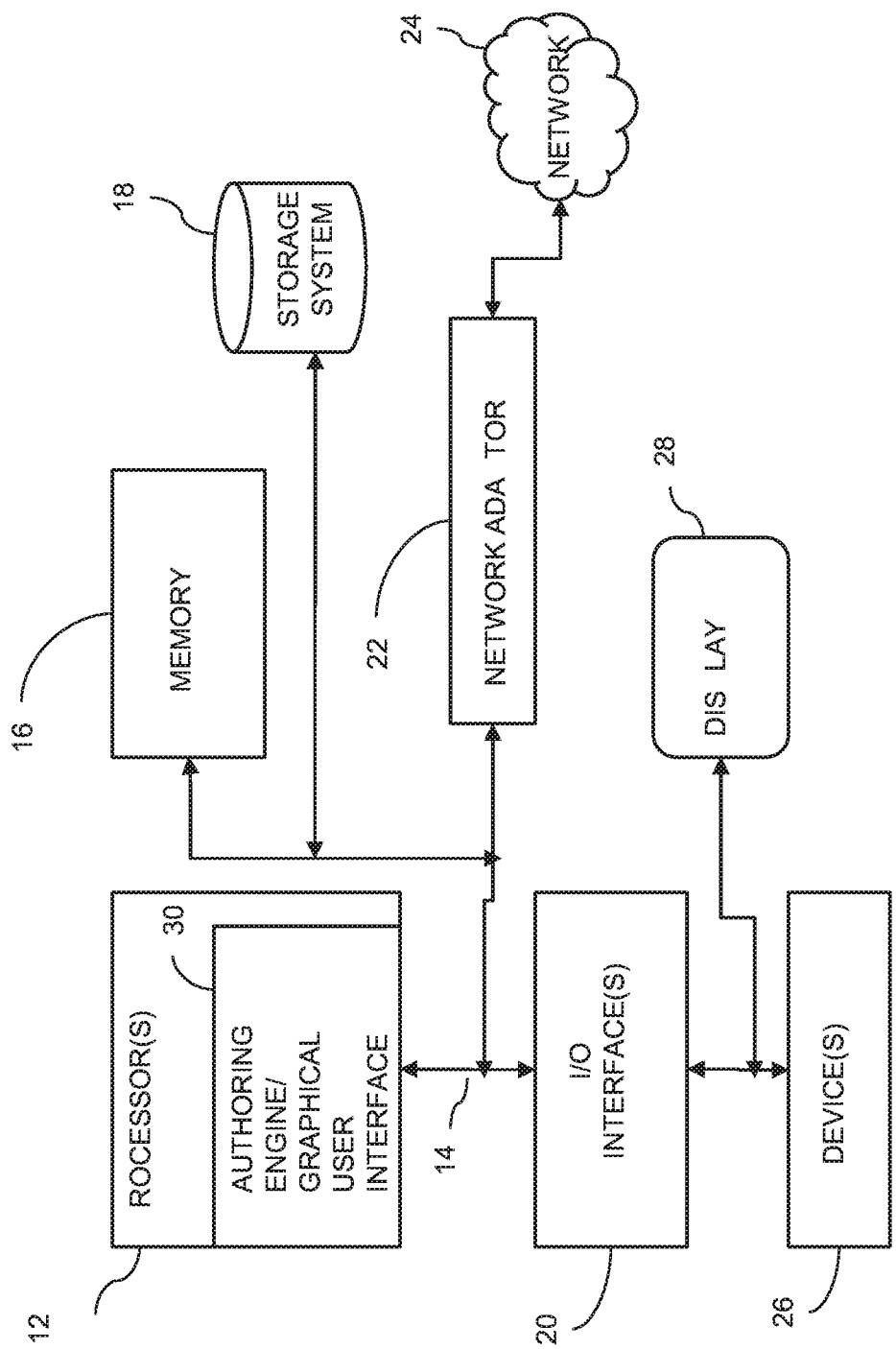
FIG. 4 illustrates a schematic of an example computer or processing system that may implement a document authoring system in one embodiment of the present disclosure.

FIG. 4 illustrates a schematic of an example computer or processing system that may implement a document authoring system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a document authoring module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computing system providing document authoring assistance, comprising:
   at least one hardware processor causing a document editor user interface to execute, the document editor user interface receiving content input by a user and providing document suggestions to the user authoring a document via the document editor user interface;
   the at least one hardware processor causing searching for information associated with the content and returning the information, wherein the suggestions provided to the user are based on the information;
   at least one storage device storing a repository of authored documents, a repository of user behavioral profiles, a knowledge base storing at least user accepted and rejected document suggestions and a repository of document templates;
   the at least one hardware processor searching the repository of document templates for a candidate template that matches a style of the document being authored;
   the at least one hardware processor inferring the candidate template responsive to not finding the candidate template in the repository of document templates,
   wherein the at least one hardware processor inferring the candidate template further includes causing a prompt to be presented to the user for the user to input whether the inferred candidate template is to be added to the repository of document templates, responsive to the user's input indicating that the inferred candidate template is not to be added to the repository of document templates, omitting adding of the inferred candidate template to the repository of document templates and storing the information associated with the content as knowledge in the knowledge base, wherein the stored information in the knowledge base is used as feedback that enhances a subsequent document suggestion, and
   wherein the at least one hardware processor causes applying of at least one document suggestion to the document.

2. The system of claim 1, wherein the hardware processor is configured to:
   responsive to the user's input indicating that the inferred candidate template is to be added to the repository of document templates, add the inferred candidate template to the repository of document templates.

3. The system of claim 1, wherein the suggestions are further determined based on a definition specified in the candidate template.

4. The system of claim 1, wherein the hardware processor is configured to detect behavior of the user while authoring the document and store information associated with the detected behavior of the user in the repository of user behavioral profiles, wherein the suggestions are further tailored based on the detected behavior of the user.

5. The system of claim 1, wherein the document templates are defined according to a user's specification.

6. The system of claim 1, wherein at least one of the document templates in the repository is defined based on the at least one hardware processor inferring a candidate template.

7. The system of claim 1, wherein the document suggestions comprise an alert notifying an inconsistency between the document being authored and the candidate template.

8. The system of claim 7, wherein the inconsistency comprises a semantic inconsistency.

9. The system of claim 7, wherein the inconsistency comprises a stylistic inconsistency.

10. A computer-implemented method comprising:
    causing a document editor user interface to execute, the document editor receiving content input by a user and providing document suggestions to the user authoring a document via the document editor user interface;
    causing searching for information associated with the content, wherein the suggestions provided to the user are based on the information;
    storing a repository of authored documents, a repository of user behavioral profiles, a knowledge base storing at least user accepted and rejected document suggestions and a repository of document templates;
    searching the repository of document templates for a candidate template that matches a style of the document being authored;
    inferring the candidate template responsive to not finding the candidate template in the repository of document templates,
    wherein the at least one hardware processor inferring the candidate template further includes causing a prompt to be presented to the user for the user to input whether the inferred candidate template is to be added to the repository of document templates, responsive to the user's input indicating that the inferred candidate template is not to be added to the repository of document templates, omitting adding of the inferred candidate template to the repository of document templates and storing the information associated with the content as knowledge in the knowledge base, wherein the stored information in the knowledge base is used as feedback that enhances a subsequent document suggestion, and
    causing applying of at least one document suggestion to the document.

11. The method of claim 10, wherein responsive to the user's input indicating that the inferred candidate template is to be added to the repository of document templates, adding the inferred candidate template to the repository of document templates.

12. The method of claim 10, wherein the suggestions are further determined based on a definition specified in the candidate template.

13. The method of claim 10, further including detecting behavior of the user while authoring the document and storing information associated with the detected behavior of the user in the repository of user behavioral profiles, wherein the suggestions are further tailored based on the detected behavior of the user.

14. The method of claim 10, wherein at least one of the document templates in the repository is defined based on the inferring a candidate template.

15. The method of claim 10, wherein the document suggestions comprise an alert notifying an inconsistency between the document being authored and the candidate template.

16. The method of claim 15, wherein the inconsistency comprises a semantic inconsistency.

17. The method of claim 15, wherein the inconsistency comprises a stylistic inconsistency.

18. A computer program product comprising a computer readable storage medium having program instructions embodied therewith, the program instructions executable by a device to cause the device to:
   execute a document editor user interface to execute, the document editor user interface receiving content input by a user and providing document suggestions to the user authoring a document via the document editor user interface;
   cause searching for information associated with the content and returning the information, wherein the suggestions provided to the user are based on the information;
   store a repository of authored documents, a repository of user behavioral profiles, a knowledge base storing at least user accepted and rejected document suggestions and a repository of document templates;
   search the repository of document templates for a candidate template that matches a style of the document being authored;
   infer the candidate template responsive to not finding the candidate template in the repository of document templates,
   wherein the device caused to infer the candidate template further includes the device causing a prompt to be presented to the user for the user to input whether the inferred candidate template is to be added to the repository of document templates, responsive to the user's input indicating that the inferred candidate template is not to be added to the repository of document templates, omitting adding of the inferred candidate template to the repository of document templates and storing the information associated with the content as knowledge in the knowledge base, wherein the stored information in the knowledge base is used as feedback that enhances a subsequent document suggestion, and
   wherein the at least one hardware processor causes applying of at least one document suggestion to the document.

19. The computer program product of claim 18, wherein the device is caused to:
   responsive to the user's input indicating that the inferred candidate template is to be added to the repository of document templates, add the inferred candidate template to the repository of document templates.

20. The computer program product of claim 18, wherein the device is caused to detect behavior of the user while authoring the document and store information associated with the detected behavior of the user in the repository of user behavioral profiles, wherein the suggestions are further tailored based on the detected behavior of the user.

* * * * *